United States Patent
Augustinowicz

(10) Patent No.: US 8,723,675 B2
(45) Date of Patent: May 13, 2014

(54) SMARTCARD CONNECTOR

(75) Inventor: Walt Augustinowicz, Englewood, FL (US)

(73) Assignee: Identity Stronghold, LLC, Englewood, FL (US)

( * ) Notice: Subject to any disclaimer, the term of this patent is extended or adjusted under 35 U.S.C. 154(b) by 551 days.

(21) Appl. No.: 12/758,586

(22) Filed: Apr. 12, 2010

(65) Prior Publication Data

US 2010/0265084 A1 Oct. 21, 2010

Related U.S. Application Data

(60) Provisional application No. 61/169,516, filed on Apr. 15, 2009.

(51) Int. Cl.
*G08B 13/14* (2006.01)

(52) U.S. Cl.
USPC .................................. 340/572.8; 235/380

(58) Field of Classification Search
USPC ............... 340/500, 540, 686.1, 686.6, 1.1, 340/10.1–10.6, 572.1–572.9; 235/492, 380
See application file for complete search history.

(56) References Cited

U.S. PATENT DOCUMENTS

| | | | | |
|---|---|---|---|---|
| 5,227,614 | A * | 7/1993 | Danielson et al. | 235/380 |
| 5,880,769 | A | 3/1999 | Nemirofsky | |
| 6,002,605 | A | 12/1999 | Iwasaki et al. | |
| 6,085,449 | A | 7/2000 | Tsui | |
| 6,121,544 | A | 9/2000 | Petsinger | |
| 6,470,284 | B1 * | 10/2002 | Oh et al. | 702/64 |
| 6,744,537 | B1 * | 6/2004 | Chiba et al. | 358/473 |
| 6,752,305 | B2 | 6/2004 | Shattuck | |
| 6,845,863 | B1 | 1/2005 | Riley | |
| 6,883,718 | B1 | 4/2005 | Le | |
| 6,991,483 | B1 * | 1/2006 | Milan et al. | 439/171 |
| 7,598,875 | B2 | 10/2009 | Noguchi | |
| 7,635,089 | B2 | 12/2009 | Augustinowicz | |
| 8,038,068 | B2 * | 10/2011 | Yuzon et al. | 235/492 |

(Continued)

FOREIGN PATENT DOCUMENTS

KR   10-2009-0088057     8/2009
KR   20-2009-0012142     12/2009

OTHER PUBLICATIONS http://www.idstronghold.com/Secure-Badgeholder-Classic-IDSH1004-001B-002-/productinfo/IDSH1004-/; IDENTITY STRONGHOLD; Jun. 2, 2007; Walt Augustinowicz; Englewood, FL.
PCT Report on Patentability, Received Oct. 26, 2012.

(Continued)

*Primary Examiner* — James Yang
(74) *Attorney, Agent, or Firm* — Neustel Law Offices

(57) ABSTRACT

A smartcard connector for connecting a smartcard within a card holder to an electronic device. The smartcard connector includes a card holder having a card holding space, a contact pad integral with the card holder and in communicative contact with the card holding space, and an external adapter integral with the card holder and in electrical contact with the contact pad. The adapter is for communicatively connecting a smartcard received and held within the card holding space and in electrical contact with the contact pad to an external data cable. The data cable is also connected to an electrical device, such as a computer, so that the smartcard may be accessed by the computer without removing the smartcard from the card holder. The card holder may also include a battery, display screen, read/write memory, security unit, notification unit, amplification unit, and/or a light.

24 Claims, 5 Drawing Sheets

(56) References Cited

U.S. PATENT DOCUMENTS

| | | |
|---|---|---|
| 2004/0069853 A1 | 4/2004 | Aharonson |
| 2005/0077348 A1 | 4/2005 | Hendrick |
| 2006/0180674 A1 | 8/2006 | Margalit |
| 2006/0219776 A1* | 10/2006 | Finn .............................. 235/380 |
| 2006/0278723 A1 | 12/2006 | Dan |
| 2007/0040017 A1 | 2/2007 | Kozlay |
| 2007/0099662 A1 | 5/2007 | Gallagher |
| 2007/0109130 A1* | 5/2007 | Edenfield ................... 340/572.8 |

OTHER PUBLICATIONS

PCT Search Report, Received Oct. 26, 2012.

* cited by examiner

SMARTCARD CONNECTOR

CROSS REFERENCE TO RELATED APPLICATIONS

I hereby claim benefit under Title 35, United States Code, Section 119(e) of U.S. provisional patent application Ser. No. 61/169,516 filed Apr. 15, 2009. The 61/169,516 application is currently pending. The 61/169,516 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a smartcard and more specifically it relates to a smartcard connector for efficiently connecting a smartcard and/or badge holder to a computer or other electronic device for transferring and/or accessing data.

2. Description of the Related Art

Any discussion of the related art throughout the specification should in no way be considered as an admission that such related art is widely known or forms part of common general knowledge in the field.

Smartcards including contact, contactless, RFID, etc. are employed in a wide range of applications. The smartcards may be credit card sized and have embedded microchips within or upon the smartcards that store data, such as financial data, health data, or other personal data. Generally, smartcards communicate with other devices through a card reader via contact of the card to the card reader or in a wireless manner, such as by using magnetic waves, radio frequency (RF), infrared, microwave, light, and/or ultraviolet radiation.

As a result of the wireless transmission of data from the smartcard, the smartcard can often times be read without the owner's awareness or permission. Because of the ease in accessing a wireless transmitting smartcard without the owner's awareness or permission, smartcards are often carried within shielding card holders to block any wireless transmission of data to and from the smartcard.

When using a card reader that requires contact with the smartcard for communicating data, it is necessary for the owner of the smartcard to remove the smartcard from the card holder, wallet, etc. and physically engage the card with the card reader. Constantly removing the smartcard from the card holder can be tedious and can often result in the owner of the smartcard forgetting to replace the smartcard back in the respective holder. Because of the inherent problems with the related art, there is a need for a new and improved smartcard connector for efficiently connecting a smartcard and/or badge holder to a computer or other electronic device for transferring and/or accessing data.

BRIEF SUMMARY OF THE INVENTION

A system for efficiently connecting a smartcard and/or badge holder to a computer or other electronic device for transferring and/or accessing data. The invention generally relates to a smartcard which includes a card holder having a card holding space, a contact pad connected to the card holder and in communicative contact with the card holding space, and an external adapter connected to the card holder and in electrical contact with the contact pad. The external adapter is for communicatively connecting a smartcard received and held within the card holding space and in electrical contact with the contact pad to an external data transfer cable via connection of the external data transfer cord to the external adapter. The data transfer cable is subsequently connected to an electrical device, such as a computer, so that the smartcard may be accessed by the computer without removing the smartcard from the card holder. The card holder may also include a battery, display screen, read/write memory, security unit, notification unit, amplification unit, and/or a light.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
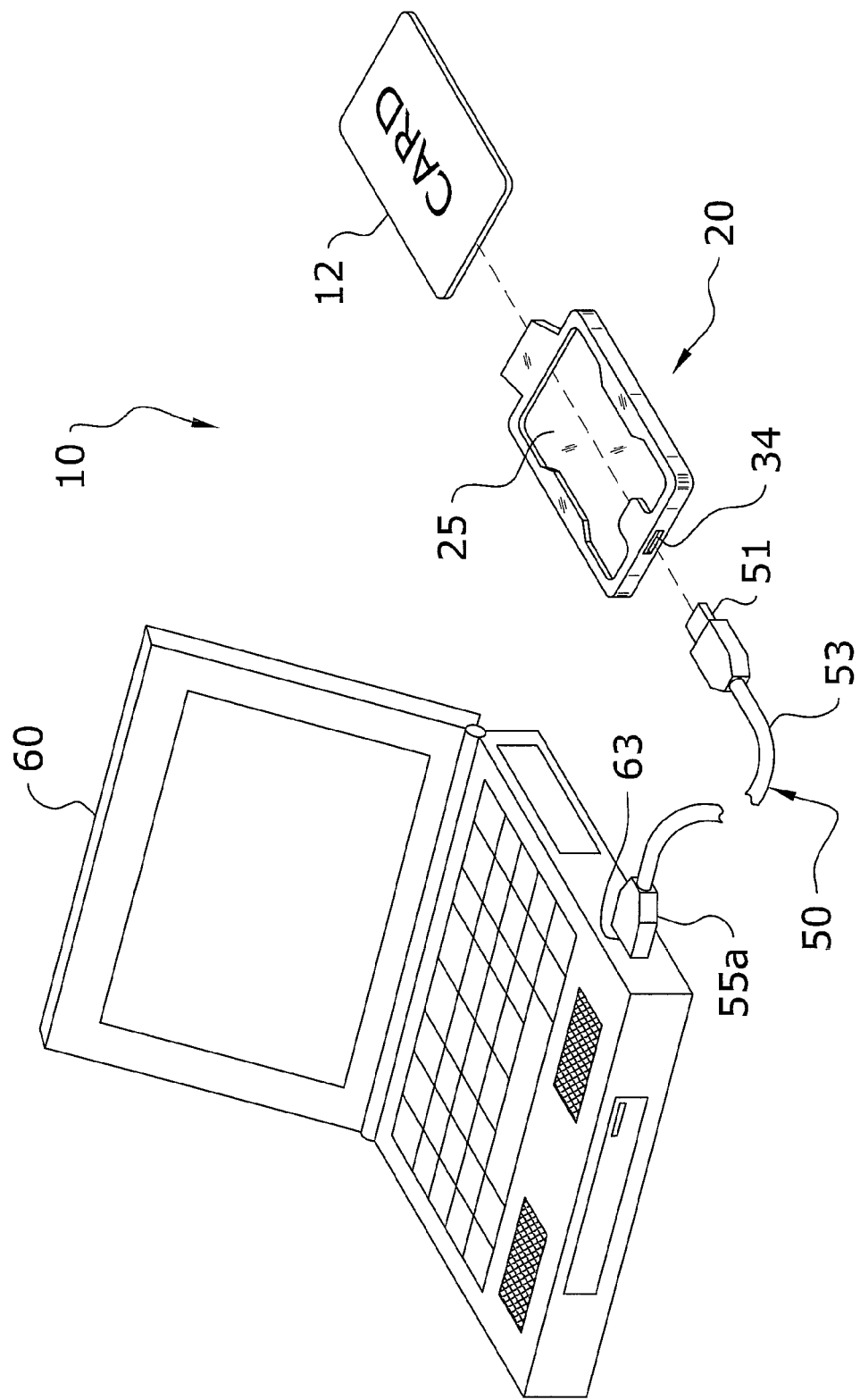
FIG. 1 is an upper perspective view of the present invention with the smartcard exploded in an exemplary manner the card holder and the card holder exploded from a first end connector of the data transfer cable, wherein the second end connector of the data transfer cable is connected to the electronic device.
Figure 2:
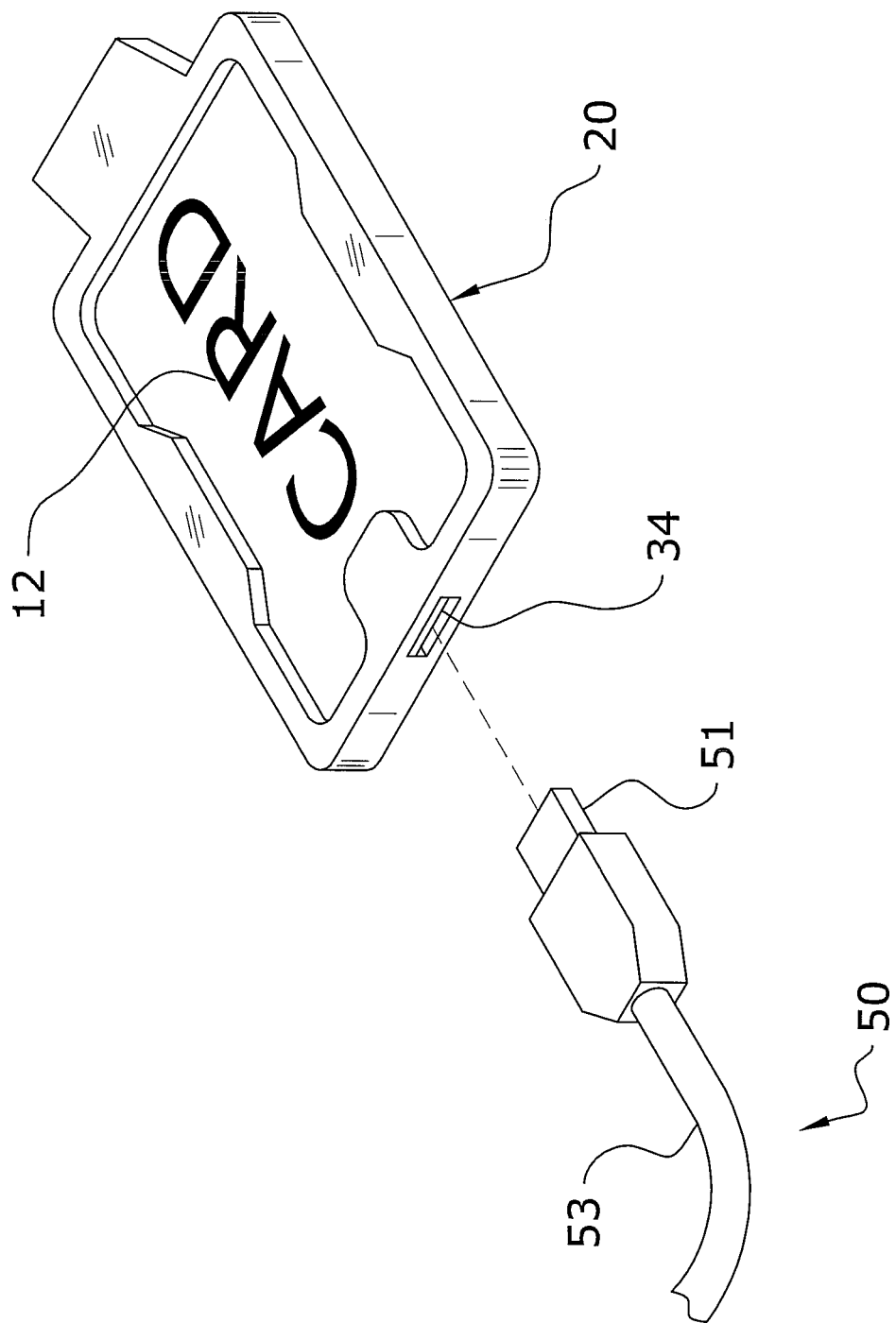
FIG. 2 is an upper perspective view of the present invention with the smartcard inserted within the card holder and the card holder exploded from a first end connector of the data transfer cable.
Figure 3:
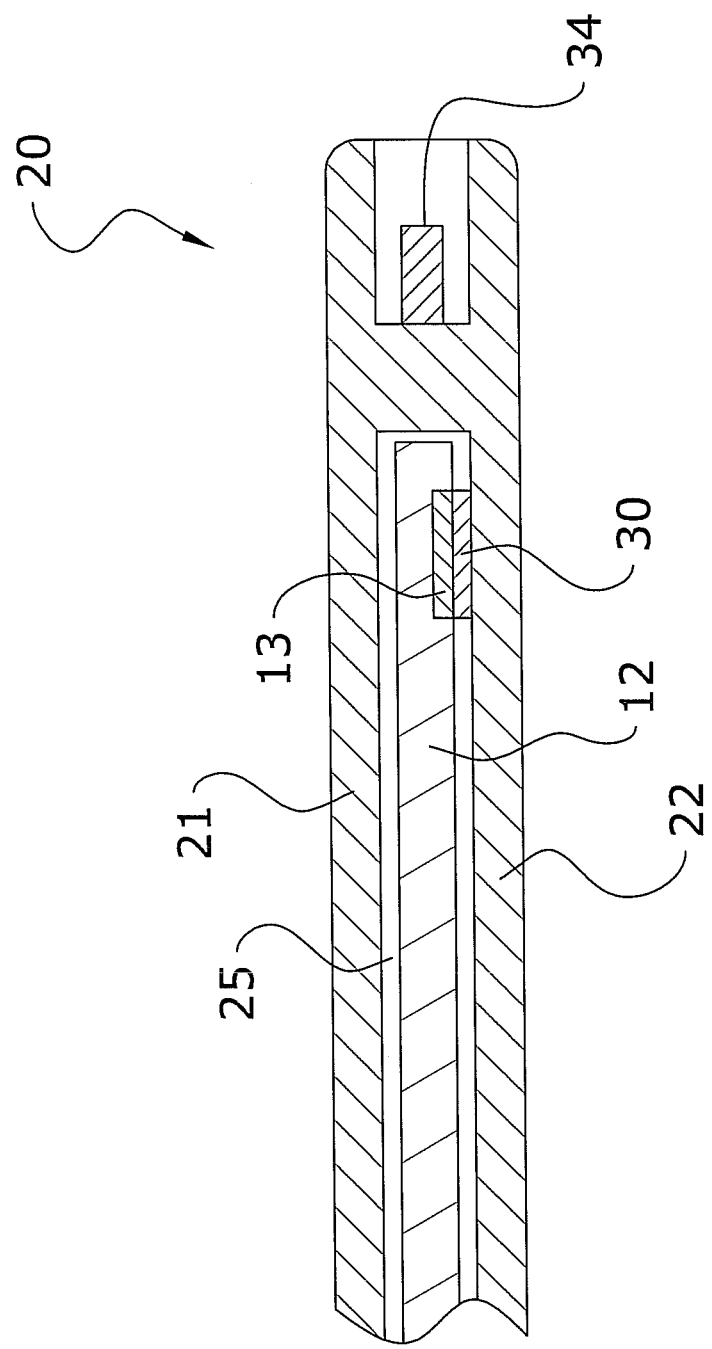
FIG. 3 is a side sectional view illustrating the smartcard within the card holder making contact with the contact pad of the card holder.
Figure 4:
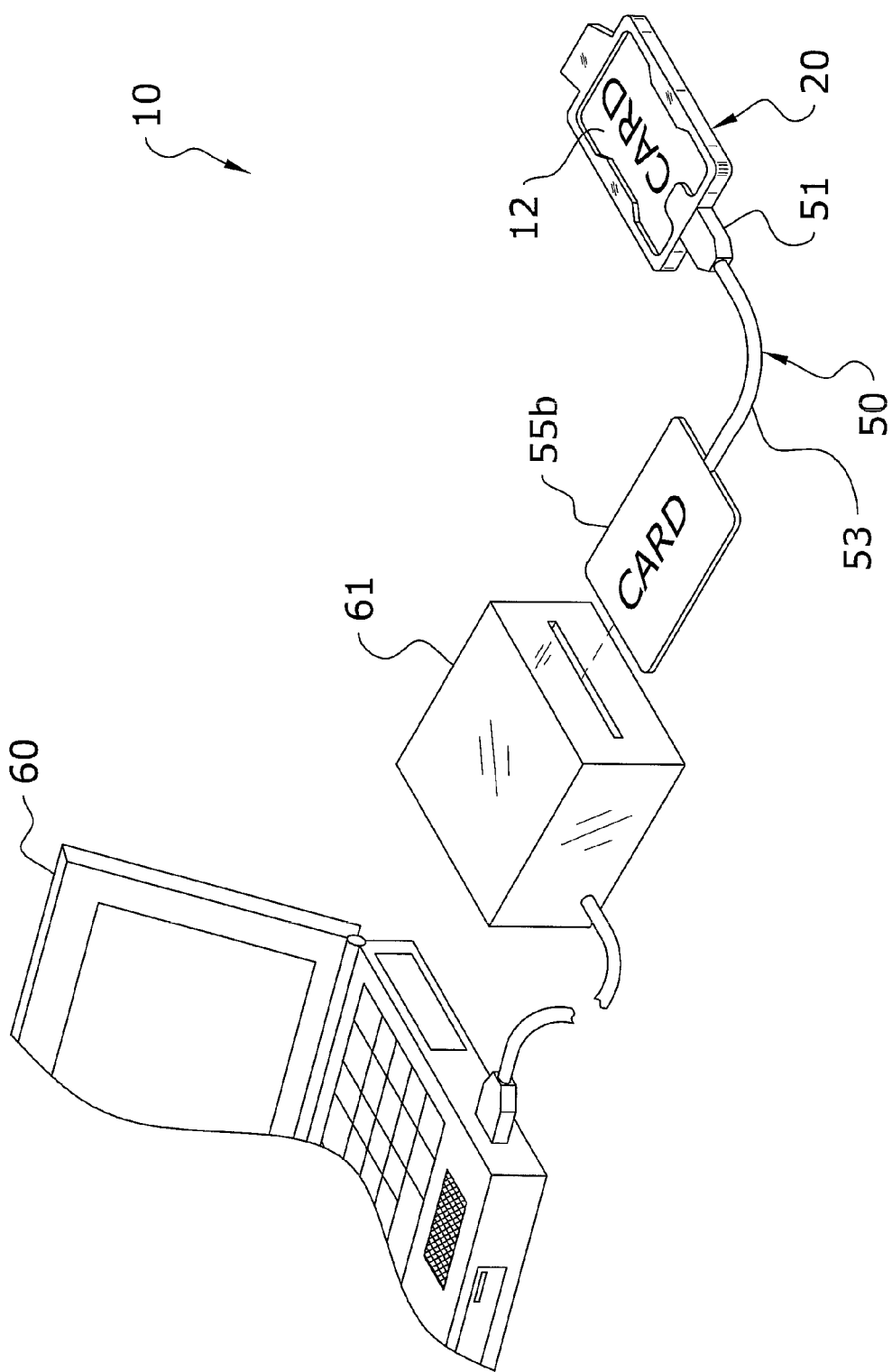
FIG. 4 is an upper perspective view of the present invention illustrating an alternate second end connector of the data transfer cable being comprised of a secondary smartcard capable of transferring data from the smartcard within the card holder to be read by the card holder of the electronic device.

Turning now descriptively to the drawings, in which similar reference characters denote similar elements throughout the several views, FIGS. 1 through 5 illustrate a smartcard connector 10, which comprises a card holder 20 having a card holding space 25, a contact pad 30 connected to the card holder 20 and in communicative contact with the card holding space 25, and an external adapter 34 connected to the card holder 20 and in electrical contact with the contact pad 30.

The external adapter 34 is for communicatively connecting a smartcard 12 received and held within the card holding space 25 and in electrical contact with the contact pad 30 to an external data transfer cable 50 via connection of the external data transfer cable 50 to the external adapter 34. The data transfer cable 50 is subsequently connected to an electronic device 60, such as a computer, so that the smartcard 12 may be accessed by the computer without removing the smartcard 12 from the card holder 20.

Figure 5:
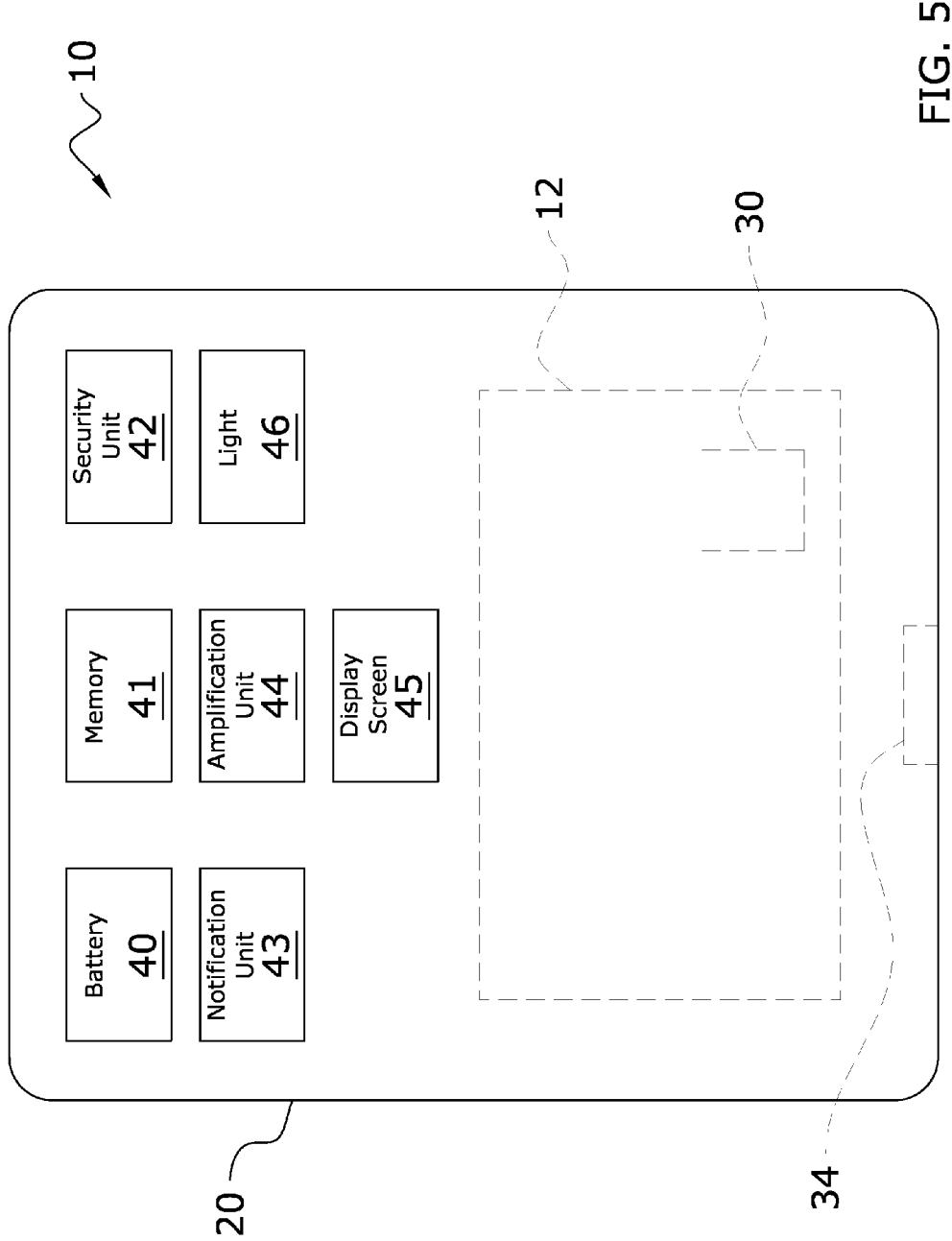
FIG. 5 is an exemplary diagram of the card holder having the battery, memory, security unit, notification unit, amplification unit, display screen, and light.

The card holder 20 may also include a battery 40, read/write memory 41, security unit 42, notification unit 43, amplification unit 44, display screen 45, and/or light 46 in various combinations. FIG. 5 illustrates exemplary alternate features of the card holder 20, such as the battery 40, memory 41, security unit 42, notification unit 43, amplification unit 44, display screen 45, and light 46. It is appreciated that the alternate features 40-46 are illustrated for example only and no electrical connections are illustrated with the alternate features 40-44 and 46 when, in actuality, the alternate features 40-46 may be connected to each other in various manners required for powering the alternate features 40-46, accessing the alternate features 40-46, or for various other reasons. It is appreciated that various methods may be used to connect the alternate features 40-46, wherein the connection methods are common in the prior art of batteries, read/write memory units, etc. and for this reason are not illustrated in detail.

B. Smartcard

Various types of communicative smartcards 12 may be utilized with the present invention. Such smartcards include, but are not limited to RFID smartcards, contactless smartcards, contact smartcards, RFID passports, and/or any other contact or contactless device that contains electronic data and may be placed within the card holder 20. The smartcard 12 is generally a square shape and credit-card sized; however various shapes and sizes may be appreciated.

The smartcard 12 also preferably includes a contact pad 13 accessible from a portion of an outer surface of the smartcard 12. The contact pad 13 is generally metal-plated and used to transfer data between the smartcard 12 and a card reader 61. The contact pad 13 can be various sizes and configurations all which transfer data or allow data to be accessed from the smartcard 12 upon contact with a mating connector 30 to the contact pad 13. The exemplary word "CARD" is illustrated on the smartcard 12 and the second end connector 55b auxiliary smartcard in the Figures; it is appreciated that the exemplary word is simply illustrative and various information or designs may be located upon either the smartcard 12 or the second end connector 55b.

C. Card Holder

The card holder 20 may be structured to hold various types and sizes of smartcards 12 including but not limited to badges, financial data cards, personal information cards, passports, etc. U.S. Pat. No. 7,635,089 (Device for Shielding Reading of a Contactless Smartcard) to Augustinowicz et al. and the SECURE BADGEHOLDER sold by IDENTITY STRONGHOLD illustrate examples of a card holder 20 that may be utilized within the present invention and is hereby incorporated by reference herein.

Generally, the card holder 20 is a handheld item and may include various neck straps, belt connectors, etc. for holding and carrying the card holder 20. The card holder 20 generally includes a first panel 21 and a second panel 22, wherein the second panel 22 is movably connected to the first panel 21 via a movable connection (not shown), such as a hinge, etc. A first tab extension may angularly extend from the first panel 21 and a second tab extension may angularly extend from the second panel 22 to provide gripping surfaces on which to push inwardly upon and operate the movable connection to open and close the first panel 21 and the second panel 22 of the card holder 20 thus providing access to the card holding space 25 therebetween. It is appreciated that FIG. 1 illustrates the smartcard 12 exploded from the card holder 20 in an exemplary manner; however the card holder 20 may receive the smartcard 12 in the manner disclosed by incorporated U.S. Pat. No. 7,635,089 and the SECURE BADGEHOLDER sold by IDENTITY STRONGHOLD.

The card holding space 25 is generally a suitable size for holding the smartcard 12. The card holding space 25 may be completely enclosed by the first panel 21 and the second panel 22 (when in the closed position) or may be partially open to an exterior of the card holder 20. In either case, the card holding space 25 receives the smartcard 12 and is suited for removably holding the smartcard 12 within the card holder 20.

The first panel 21 and/or the second panel 22 may include shielding materials for shielding a wireless transmission of data, such as common with contactless or RFID smartcards 12. Alternately, the first panel 21 and/or the second panel 22 may not have shielding materials. It is appreciated that the card holder 20 may be comprised of various alternate structures than illustrated all which removably hold a smartcard 12. In the case of a dual interface smartcard 12 with contact and contactless interfaces, the shielding card holder 20 would allow the card holder 20 to continue to shield the contactless interface of the smartcard 12 while the smartcard 12 is connected to the electronic device 60 through the data transfer cable 50 and adapter 34.

The card holder 20 includes an internal first signal transfer means 30 adapted to receive electrical or data signals through contacting the contact pad 13 or in alternate manners. In the preferred, the first signal transfer means 30 is comprised of a contact pad located internal to the card holder 20 and in communicative contact with the card holding space 25 so that the contact pad 30 may electrically contact the contact pad 13 of the smartcard 12 when the smartcard 12 is placed within the card holding space 25 of the card holder 20.

The contact pad 30 is integrally connected to the card holder 20 and may extend from the first panel 21, the second panel 22, or other elements of the card holder 20 all which position the contact pad 30 to make electrical contact with the contact pad 13 of the smartcard 12 when the smartcard 12 is positioned within card holding space 25. Like the contact pad 13 of the smartcard 12, the contact pad 30 of the card holder 20 may have various metal-coated plates or be structured in various manners to mate with the contact pad 13 of the smartcard 12 and maintain an electrical or data transfer connection.

The card holder 20 includes an external second signal transfer means 34 adapted to receive electrical or data signals from the contact pad 30 of the card holder 20. In the preferred, the second signal transfer means 34 is comprised of an adapter located external to the card holder 20 or accessible from an exterior of the card holder 20 and in electrical and/or communicative contact with the contact pad 30 of the card holder 20 so that the contact pad 30 of the card holder 20 may electrically connect the contact pad 13 of the smartcard 12 with the adapter 34 when the smartcard 12 is placed within the card holding space 25 of the card holder 20.

The adapter 34 may be connected to the first panel 21, second panel 22, or other elements of the card holder 20 all which allow for electrical connection to the contact pad 30 of the card holder 20. The adapter 34 may be comprised of a plug or socket structure and may be adapted to receive USB connectors or various other types of connectors capable of transferring data from the smartcard 12. The adapter 34 may be recessed within the card holder 20 or extend outwardly from the card holder 20.

D. Battery

The card holder 20 may include a rechargeable battery 40 or other electrical storage unit contained within the card holder 20 that could charge while the electronic device 60 is attached to the card holder 20 via the data transfer cable 50. The battery 40 could additionally be used for a light 46 or other electronics of the card holder 20. Various non rechargeable batteries may also be utilized with the card holder 20 as appreciated.

E. Memory

The card holder 20 may also include a built-in flash drive or other read/write memory chip 41 that would allow data storage in the card holder 20. Various amounts of memory 41 may be used with the memory 41 and the memory 41 would preferably be communicatively connected to the adapter 34 thus allowing the transfer of data to and/or from the memory 41 through the data transfer cable 50 removably connected to the adapter 34 of the card holder 20.

F. Security Unit

The card holder 20 may also include a security unit 42 to prevent access to the memory 41 through the adapter 34 unless an authorized smartcard 12 is in electrical contact with the contact pad 30 of the card holder 20. The security unit 42 may alternately or additionally be software within the memory 41 or a biometric sensor for preventing access to the smartcard 12 through the adapter 34 and/or the memory 41 without proper identification through biometric means. The biometric sensor embodied security unit 42 would preferably be located upon the card holder 20 and may be powered via the electronic device 60 and/or battery 40. The security unit 42 in generally may also be powered via the electronic device 60 and/or battery 40.

G. Notification Unit

The card holder 20 may also include a notification unit 43 comprising audio and/or visual notification devices to alert an individual if the contained smartcard 12 within the card holder 20 is being accessed and/or if an RF carrier is present and at the same frequency as the contained smartcard 12. Various speakers and/or displays may be located upon the card holder 20 to provide the audio and/or visual notification as appreciated. The notification unit 43 may be powered via the rechargeable battery 40 and/or the connected electronic device 60.

H. Amplification Unit

In another embodiment, the card holder 20 may have an amplification unit 44 that would allow for longer range reading and sending of data from a contactless smartcard 12 inserted within the card holding space 25 of the card holder 20. The amplification unit 44 would generally be connected to the smartcard 12 through the contact pad 30 of the card holder 20 and may be powered in various manners, such as by the rechargeable battery 40 and/or the connected electronic device 60.

I. Display Screen

The card holder 20 may also include a display screen 45 or window for viewing and/or displaying smartcard 12 data. The display screen 45 may electronic or simply a transparent window to view the data. The display screen 45 would be electrically connected to the adapter 34 for being powered by the electronic device 60 or alternately electrically connected to a battery 40.

J. Light

The card holder 20 may also include a light 46 for decoration or for visual use. The light 46 could be located upon the exterior of the card holder 20 and would generally be powered by the electronic device 60 through the data transfer cable 50 connected to the adapter 34. The light 46 would thus be electrically connected to the adapter 34 for being powered by the electronic device 60 or alternately electrically connected to a battery 40.

K. Data Transfer Cable

The data transfer cable 50 is adapted to electrically connect to the adapter 34 of the card holder 20 to transfer data from or to the smartcard 12 electrically connected to the contact pad 30 of the card holder 20. The data transfer cable 50 generally includes a first end connector 51, an elongated cord 53 extending therefrom, and a second end connector 55a, 55b extending from an opposing end of the cord 53. It is appreciated that the data cable 50 may be easily disconnected from the card holder 20 and/or the electronic device 60, such as in the case that the user forgets to unplug the cable 50 from the card holder 20 before beginning to walk away with the card holder 20, wherein the card holder 20 would easily automatically disconnect from the cable 50.

The first end connector 51 may have various plugs and/or sockets to electrically connect to the adapter 34 of the card holder 20 in a manner that allows for data transfer or access. An example of a suitable plug is a USB connector; however it is appreciated that the first end connector 51 may be comprised of various structures all which mate with the adapter 34 and allow for a removable and secure connection to the adapter 34.

Likewise, the second end connector 55a, 55b may have various plugs and/or sockets to electrically connect to the electronic device 60 in a manner that allows for data transfer or access. An example of a suitable plug is a USB connector 55a; however it is appreciated that the second end connector 55a, 55b may be comprised of various structures all which mate with the connector 61, 63 of the electronic device 60. For example, an auxiliary smartcard may comprise the second end connector 55b to be received by a card reader 61 of the electronic device 60 and thus interface the cable 50 with the card reader 61 to communicate the data from the smartcard 12 within the card holder 20. It is appreciated that the auxiliary smartcard 55b would also include contact points for being read by the card reader 61.

L. Electronic Device

The electronic device 60 may be any type of device that drives data transfer or access to and/or from the smartcard 12.

Suitable devices include personal computers, such as laptops, desktop computers, etc. Various other devices, such as PDAs, smart phones, etc. may be used as the electronic device 60. The electronic device 60 generally includes at least one port 63 or card reader 61 to receive the second end connector 55a, 55b of the data transfer cable 50.

M. Operation of Preferred Embodiment

In use, when information is desired to be transferred, read, or otherwise accessed from the smartcard 12 within the card holder 20, the first end connector 51 of the data transfer cable 50 is connected to the adapter 34 and the second end connector 55a, 55b of the data transfer cable 50 is connected to or read by the electronic device 60. Data may now be transferred between the smartcard 12 and the electronic device 60 without having to remove the smartcard 12 from the card holder 20.

When the owner of the smartcard 12 is finished transferring or accessing data, the first end connector 51 of the data transfer cable 50 is simply removed from the adapter 34 thus freeing the smartcard 12 from the data transfer cable 50 and preventing any further access to the smartcard 12 through the contact pad 13 of the smartcard 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A smartcard connector system, comprising:
a card holder having a card holding space, wherein said card holding space is adapted to receive an entire smartcard within said card holder;
wherein said card holder is comprised of a shielding card holder to shield wireless transmissions from a smartcard within said card holder;
a first signal transfer means connected to said card holder, wherein said first signal transfer means is in contact with said card holding space; and
a second signal transfer means connected to said card holder, wherein said second signal transfer means is in communicative contact with said first signal transfer means;
wherein said second signal transfer means is accessible from an exterior of said card holder and wherein said second signal transfer means is adapted to communicatively connect a smartcard received and held within said card holding space and in communicative contact with said first signal transfer means to an external data cable;
wherein said external data cable includes a first end connector to connect to said second signal transfer means and a second end connector to connect to an electronic device, wherein said second end connector is comprised of an auxiliary smartcard.

2. The smartcard connector system of claim 1, wherein said card holder includes a rechargeable battery.

3. The smartcard connector system of claim 1, wherein said card holder includes read/write memory.

4. The smartcard connector system of claim 1, wherein said card holder includes a security unit.

5. The smartcard connector system of claim 4, wherein said security unit is comprised of a biometric sensor.

6. The smartcard connector system of claim 1, wherein said card holder includes a notification unit to alert a presence of an auxiliary radio frequency carrier.

7. The smartcard connector system of claim 1, wherein said card holder includes an amplification unit to amplify a transmitted wireless signal from a held smartcard.

8. The smartcard connector system of claim 1, including a display screen upon said card holder for displaying smartcard data.

9. The smartcard connector system of claim 1, wherein said card holder includes a light.

10. A smartcard connector system, comprising:
a card holder having a card holding space, wherein said card holding space is adapted to receive an entire smartcard within said card holder;
wherein said card holder is comprised of a shielding card holder to shield wireless transmissions from a smartcard within said card holder;
a contact pad integral with said card holder and in communicative contact with said card holding space; and
an adapter integral with said card holder and in electrical contact with said contact pad, wherein said adapter is accessible from an exterior of said card holder;
wherein said adapter is for communicatively connecting a smartcard received and held within said card holding space and in electrical contact with said contact pad to an external data cable via connection of said data cable to said adapter;
wherein said data cable includes a first end connector to connect to said adapter and a second end connector to connect to an electronic device, wherein said second end connector is comprised of an auxiliary smartcard.

11. A smartcard connector system, comprising:
a smartcard adapted to store data and having a first contact pad;
a card holder having a card holding space, wherein said smartcard is removably positioned within said card holding space;
wherein said card holding space is adapted to receive all of said smartcard within said card holder;
wherein said card holder is comprised of a shielding card holder to shield wireless transmissions from said smartcard within said card holder;
a second contact pad connected to said card holder and in communicative contact with said card holding space and wherein said second contact pad is in electrical contact with said first contact pad;
an adapter connected to said card holder and in electrical contact with said second contact pad, wherein said adapter is accessible from an exterior of said card holder; and
a data cable having a first end connector and a second end connector;
wherein said first end connector is removably connected to said adapter;
wherein said second end connector is adapted to removably connect to an electronic device to access data from said smartcard within said card holding space of said card holder, wherein said second end connector is comprised of an auxiliary smartcard.

12. The smartcard connector system of claim 11, wherein said first end connector is comprised of a USB connector.

13. The smartcard connector system of claim 11, wherein said auxiliary smartcard is fixedly connected to said data cable.

14. The smartcard connector system of claim 11, wherein said electronic device is comprised of a computer.

15. The smartcard connector system of claim 1, wherein said second signal transfer means is comprised of an amplification unit for providing increased range reading and sending of data from a smartcard within said card holder.

16. The smartcard connector system of claim 1, wherein said card holder includes a first panel and a second panel that define said card holding space between thereof, wherein at least one of said first panel and said second panel include shielding materials for shielding a wireless transmission of data.

17. The smartcard connector system of claim 1, wherein said card holder includes a transparent window.

18. The smartcard connector system of claim 1, wherein said card holder includes a notification unit that notifies a user that a smartcard within said card holder is being accessed.

19. The smartcard connector system of claim 1, wherein said card holder includes a notification unit.

20. The smartcard connector system of claim 11, wherein said first contact pad of said smartcard is connected to said second contact pad.

21. The smartcard connector system of claim 11, wherein said card holder includes a first panel and a second panel that define said card holding space between thereof, wherein at least one of said first panel and said second panel include shielding materials for shielding a wireless transmission of data.

22. The smartcard connector system of claim 11, wherein said card holder includes a first panel and a second panel that define said card holding space between thereof, wherein both said first panel and said second panel include shielding materials for shielding a wireless transmission of data.

23. The smartcard connector system of claim 11, wherein said card holder includes a notification unit that notifies a user that said smartcard is being accessed.

24. The smartcard connector system of claim 11, wherein said card holder includes a notification unit.

* * * * *